(12) United States Patent
Ding

(10) Patent No.: US 7,979,717 B2
(45) Date of Patent: Jul. 12, 2011

(54) SECURE REMOVABLE CARD HAVING A PLURALITY OF INTEGRATED CIRCUIT DIES

(75) Inventor: Zhimin Ding, Sunnyvale, CA (US)

(73) Assignee: Greenliant LLC, Santa Clara, CA (US)

( * ) Notice: Subject to any disclaimer, the term of this patent is extended or adjusted under 35 U.S.C. 154(b) by 655 days.

(21) Appl. No.: 12/100,400

(22) Filed: Apr. 9, 2008

(65) Prior Publication Data
US 2009/0257590 A1 Oct. 15, 2009

(51) Int. Cl.
*G06F 21/00* (2006.01)
*H04M 1/00* (2006.01)
(52) U.S. Cl. ............... 713/185; 726/9; 726/20; 455/558
(58) Field of Classification Search .............. 726/9, 20; 380/44–47, 277–286; 713/185; 455/558
See application file for complete search history.

(56) References Cited

U.S. PATENT DOCUMENTS

| | | | |
|---|---|---|---|
| 6,581,841 B1* | 6/2003 | Christoffersen | 235/492 |
| 2002/0023963 A1* | 2/2002 | Luu | 235/492 |
| 2002/0026578 A1* | 2/2002 | Hamann et al. | 713/159 |
| 2003/0135731 A1* | 7/2003 | Barkan et al. | 713/155 |
| 2005/0120205 A1* | 6/2005 | Umezawa et al. | 713/156 |
| 2006/0172573 A1* | 8/2006 | Laitinen et al. | 439/159 |
| 2008/0016352 A1* | 1/2008 | Perlman | 713/171 |
| 2008/0080255 A1* | 4/2008 | Kagan et al. | 365/185.23 |
| 2009/0075698 A1* | 3/2009 | Ding et al. | 455/558 |
| 2009/0121028 A1* | 5/2009 | Asnaashari et al. | 235/492 |
| 2009/0121029 A1* | 5/2009 | Asnaashari et al. | 235/492 |
| 2009/0122989 A1* | 5/2009 | Asnaashari et al. | 380/278 |
| 2010/0023747 A1* | 1/2010 | Asnaashari et al. | 713/150 |

OTHER PUBLICATIONS

Posegga, "The WebSIM: Smartcard Goes Internet," Joachim. Posegga@Telekom.de, Jan. 31, 2000, 2 pages.
Gemalto, "dot-sim, How a little dot can have a big impact on your business" Telecom Marketing & Strategy Team, Jul. 2006, pp. 1-18.
Guthery, et al., "How to Turn A GSM SIM Into A Web Server," Submitted for CARDIS 2000., pp. 1-13.
Rees, et al., "Webcard: A Java Card Web Server," CITI Technical Report 99-3., Oct. 1, 1999, pp. 1-6.
U-M Develops the World's Smallest Web Server in Partnership With Schlumberger, Univ. of Michigan News Service., Oct. 27, 1999, pp. 1-2.

(Continued)

*Primary Examiner* — Christian LaForgia
(74) *Attorney, Agent, or Firm* — DLA Piper LLP (US)

(57) ABSTRACT

A secure removable card has electrical connections for communication therewith. The card comprises a first integrated circuit die, with the first die including a processor. The card has a second integrated circuit die, with the second die including a non-volatile memory for storing a secret key, and a controller for controlling the operation of the non-volatile memory. A bus connects the first die with the second die. The processor can generate a key pair, having a public key portion and a private key portion upon power up, and transfers the public key portion across the bus to the second die. The controller can receive the public key and encrypt the secret key with the public key to generate a first encrypted key, and can transfer the first encrypted key across the bus to the first die. The processor can receive the first encrypted key and can decrypt the first encrypted key to recover the secret key, and can encrypt data with the secret key for communicating along the electrical connections external to the card.

9 Claims, 3 Drawing Sheets

OTHER PUBLICATIONS

Monroe, "World's Smallest Web Server A Partnership Project," The University Record., Dec. 13, 1999. pp. 1-2.

Ito, et al., "Secure Internet Smartcards," Lecture Notes in Computer Science, Springer Berlin/Heidelberg, vol. 2041, 2001, pp. 1-2.

"Oberthur Card Systems Enables SIM Cards to Host Operator' Web Portals," Oberthur Card Systems, pp. 1-2.

Chan, "Web-Enabled Smart Card For Ubiquitous Access Of Patient's Medical Record," Internet Computing And Electronic Commerce Laboratory, Dept. of Computing, The HongKong Polytechnic Univ., Hung Hom, Kowloon, HongKong, pp. 1-10.

"Internet Smart Card, security2go—WebServer," Giesecke & Devrient, 2007, pp.1-2.

Balaban, "Can Web-Server Card Brighten A Drab SIM?" CardTechnology.com and SourceMedia, Inc., 2007, pp. 1-5.

Jackson, "Cards Get Smarter," Government Computer News, May 2007, pp. 1-2.

8th Edition e-Smart Conference & Demos 2007, Sep. 2007, Sophia Antipolis, French Riviera, 4 pages.

Lenhart, "The Smart Card Platform," ETSI Technical Committee Smart Card Platform (TB SCP), 26 pages.

* cited by examiner

SECURE REMOVABLE CARD HAVING A PLURALITY OF INTEGRATED CIRCUIT DIES

TECHNICAL FIELD

The present invention relates to a secure removable card having a plurality of integrated circuit dies, one of which contains a non-volatile memory for storing a secret key, wherein the card is secure from probing.

BACKGROUND OF THE INVENTION

Mobile wireless communication devices, such as cell phones are well known in the art. Typically, a cell phone has a removable card (called "SIM card") which consists of a processor with RAM, ROM or EEPROM or Flash memory, I/O pads, and security monitoring circuit all mounted on a removable card. The non-volatile memory in the SIM card is to store information required to access the mobile operator's network. Thus, the card may store information such as telephone number, access code, number of minutes, calling plan etc.

A network of interconnected computer networks ("Internet") is also well known in the art. The Internet can be accessed by computers having a wired connection, or through a wireless network.

With the increase in speed in mobile networks, such as the 3G network, users of mobile wireless devices desire to access the Internet via their mobile wireless communication devices.

Thus, increasingly, the SIM card may be used to store secure information such as passwords, financial data etc. used to access the Internet or during a session on the Internet.

Therefore, there is increasing demand for higher capacity SIM cards that include a higher performance processor and larger amount of non-volatile memory. However, since the technology to manufacture high performance processors may not be compatible or optimal for manufacturing of memory devices or memory controller devices, integrated on the same die, there is a need to fab these devices on separate dies and to integrate the dies into a multichip module. Hence it is desirable to provide a mechanism whereby these types of information are secure even if the removable card falls into the wrong hands.

SUMMARY OF THE INVENTION

Accordingly, in the present invention, a secure removable card has electrical connections for communication therewith. The card comprises a first integrated circuit die, with the first die including a processor. The card has a second integrated circuit die, with the second die including a non-volatile memory for storing a secret key, and a controller for controlling the operation of the non-volatile memory. A bus connects the first die with the second die. The processor can generate a key pair, having a public key portion and a private key portion upon power up, and transfers the public key portion across the bus to the second die. The controller can receive the public key and encrypt the secret key with the public key to generate a first encrypted key, and can transfer the first encrypted key across the bus to the first die. The processor can receive the first encrypted key and can decrypt the first encrypted key to recover the secret key; and can encrypt data with the secret key for communicating along the electrical connections external to the card.

DETAILED DESCRIPTION OF THE PREFERRED EMBODIMENT

Figure 1:
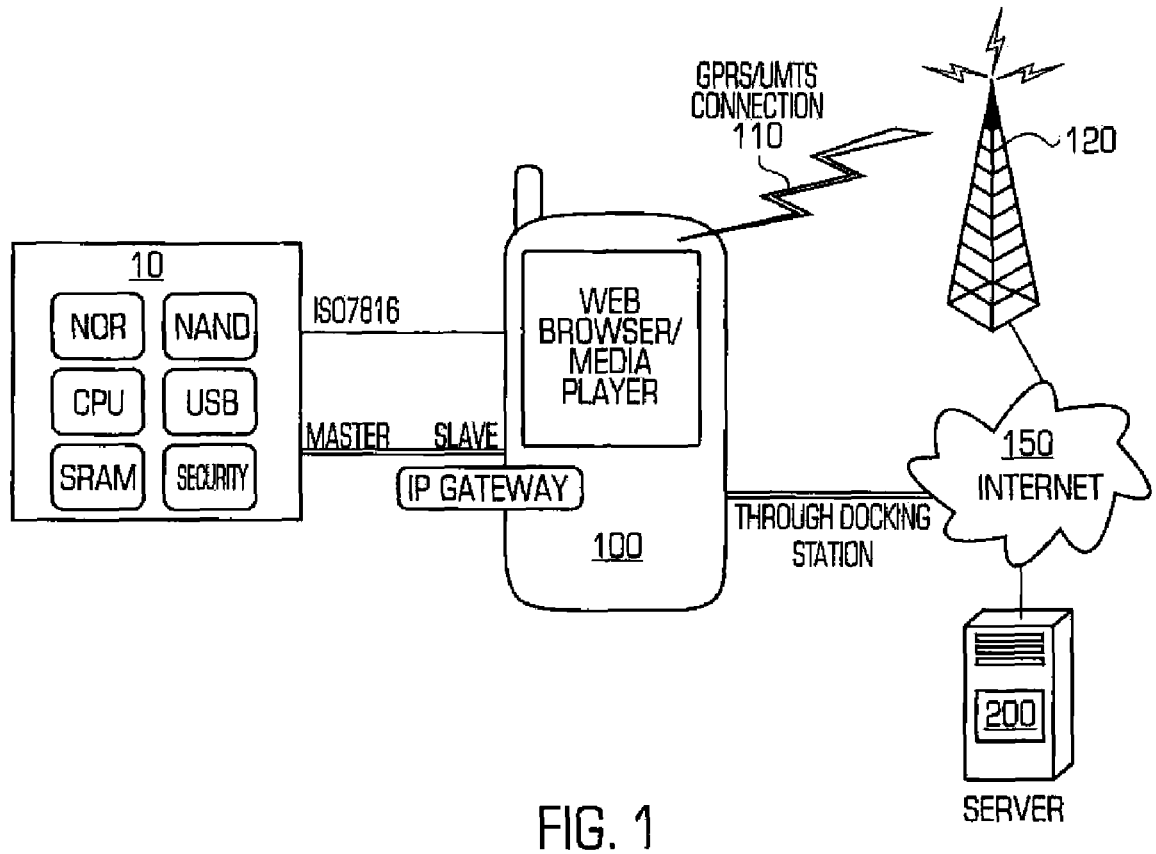
FIG. 1 is a diagram of the removable card of the present invention connected to a mobile wireless communication device of the present invention for connection to a mobile network, as well as to the Internet.

Referring to FIG. 1 there is a shown a graphic illustration of a mobile wireless communication device 100, e.g. a cell phone 100 for use in a publicly accessible (common carrier) wireless communication network, such as a cellular network 110, which includes cellular access towers 120. The cellular network 110, through access servers (not shown) located on or near the cell phone towers 120 can connect to a network of interconnected computer networks 150, also known as the Internet 150. Thus, the cell phone 100 can communicate wirelessly with other cell phones 100 on the cell phone network 110. In addition, the cell phone 100 can communicate wirelessly with the Internet 150 through the cell phone network 110 which has the access servers connected to the Internet 150. Further, as will be shown hereinbelow, the removable card 10 portion of the cell phone 100 can also be connected directly to the Internet 150 through a network portal device, such as docking station 160, which is connected to a personal computer, which connects to the Internet 150.

The cell phone 100 of the present invention has a removable card 10, much like the removable SIM card of the prior art. However, as will be seen, the features of the removable card 10 of the present invention are vastly different and improved over the removable SIM card of the prior art. As a result, the removable card 10 of the present invention is called a SIM module.

Figure 2:
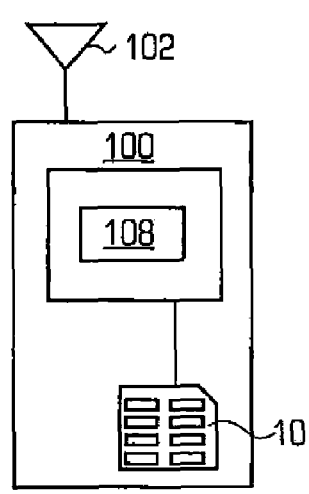
FIG. 2 is a schematic diagram of the removable card of the present invention connected to the mobile wireless communication device of the present invention.

Referring to FIG. 2, there is shown a schematic diagram of the removable card 10 of the present invention connected to the mobile wireless communication device 100 of the present invention. Because the device 100 is designed to operate wirelessly across the cellular network 110, the device 100 comprises an antenna 102. A transceiver 104 is connected to the antenna 102. The transceiver 104 transmits and receives modulated signals to and from the cellular network 110. Such components are well known in the art. The received signals may be demodulated and then converted into digital signals and provided to a gateway 106. The gateway 106 may also have an NAT (Network Address Translation) circuit. An NAT circuit 106 translates or maps a private IP address to one or more ports of a public IP address. As will be discussed hereinafter, the device 100 (through the removable card 10), may be assigned a public address (through the well known DHCP protocol) when the device is connected to the Internet 150, and may have a private address when operating as a local server such that the device 100 is not connected to the Internet 150. Digital signals to be transmitted are modulated and converted by the transceiver 104 into appropriate electromagnetic frequency signals for transmission by the antenna 102. Because the device 100 can access the Internet 150, a browser and media player 112 is also provided. The browser and media player 112 interfaces in the well known TCP/IP protocol as well as the HTTP protocol with the gateway 106 to provide and to receive digital signals received by the device 100 from the Internet 150, which may be displayed on a display 108. Associated with the browser and media player 112 is a processor (not shown) which also controls the transceiver 104 and other well known hardware circuits of the device 100 to communicate with the network 110.

The removable card 10 of the present invention is connected to the device 100 through a well known USB interface 114 through the docking station 160. The USB interface 114 connects to the Gateway 106. Thus, digital signals from the removable card 10 are provided to and from the device 100 through the docking station 160, through the USB interface 114, through the gateway 106 and through the transceiver 104 to the antenna 102.

Figure 3:
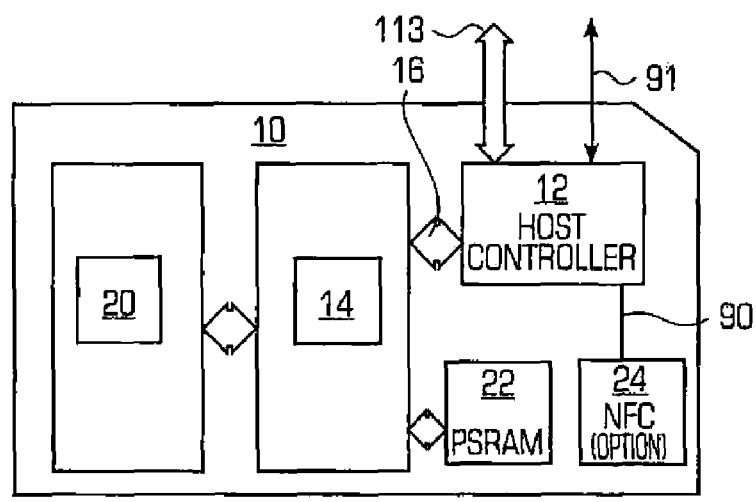
FIG. 3 is a block level diagram circuit diagram of the removable card of the present invention.

The removable card 10 of the present invention is shown in greater detail in FIG. 3. in particular, the card 10 comprises a host controller 12 which interfaces with the USB interface 114 through a USB bus 113. In addition, the host controller 12 is connected to a memory controller 14, through a bus 16. The memory controller 14 controls a NAND memory 20 and a PSRAM 22. The operation of the memory controller 14 in controlling the NAND memory 20 and the PSRAM 22 is fully described in U.S. patent application Ser. No. 11/637,420, published on Jun. 28, 2007 under publication 2007-0147115, and assigned to the present assignee, which disclosure is incorporated by reference herein in its entirety. The host controller 12 may also be optionally connected to a Near Field Communicator (NFC) 24. An NFC 24 is a close range RF circuit that permits wireless communication in close proximity. Thus, the device 100 with the NFC 24 may act as an "electronic wallet" for financial transactions or for identification purpose, or as another access to the Internet 150. Of course, the device 100 can also be connected wirelessly with the Internet 150 via other forms of wireless networks, such as a Wi-Fi network.

Figure 4:
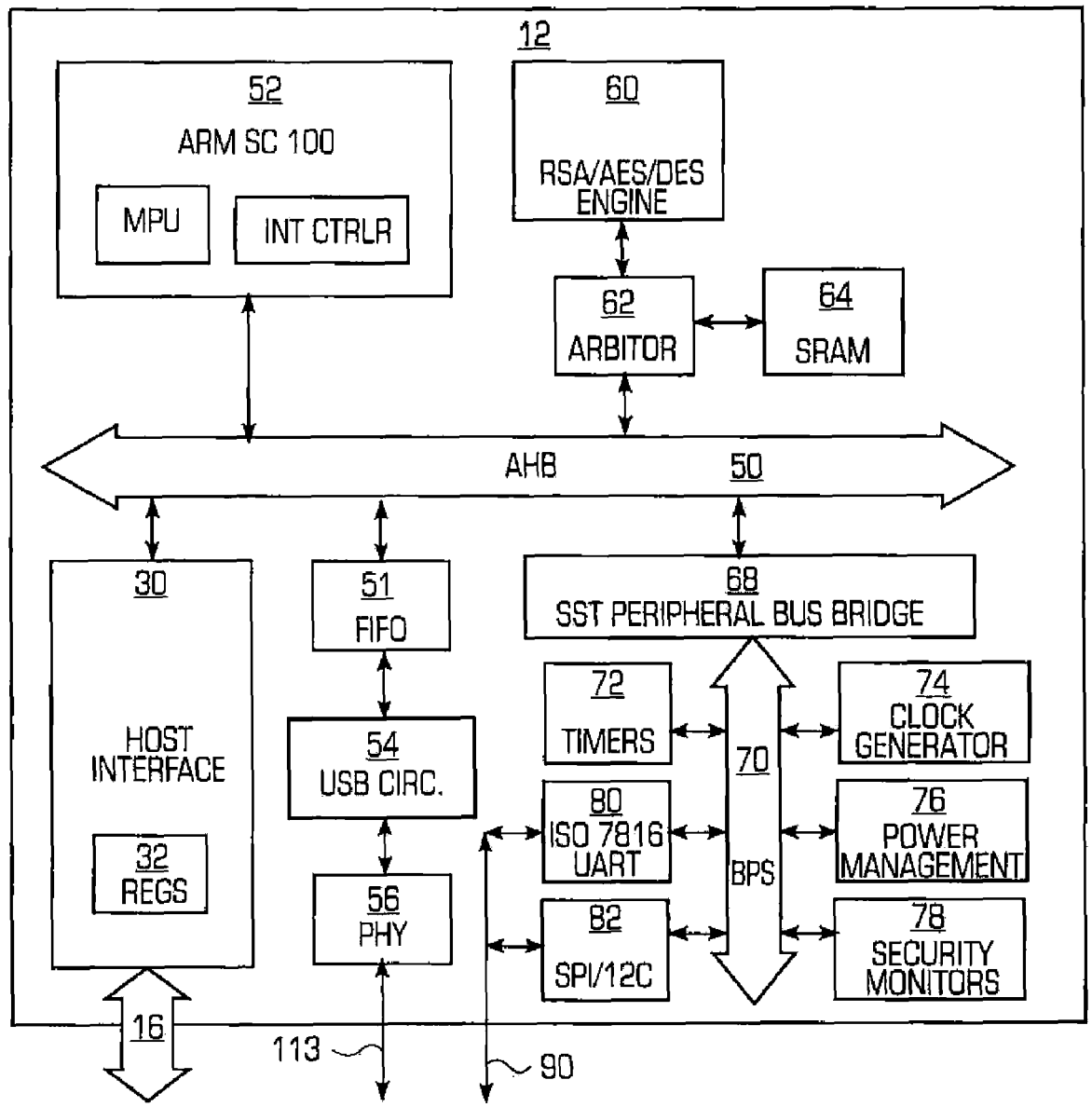
FIG. 4 is a detailed circuit diagram of the processor portion of the removable card of the present invention.

Referring to FIG. 4, there is shown a detailed schematic block diagram of the host controller 12. The host controller 12 comprises a high speed bus 50, to which a host interface 30, for connecting to the memory controller 14 is attached. The host interface 30 also comprises registers 32 for temporarily holding data that is supplied to and from the memory controller 14. The host controller 12 also comprises a FIFO (First-In First Out) circuit 51 which is connected to the high speed bus 50. The FIFO 51 is also connected to a USB controller circuit 54, which is connected to a PHY circuit 56 (which is the standard physical layer interface for a USB port. The circuit 56 includes pads, voltage level shifters and clock recovery circuits.) for connection to the USB bus 113. A secure processor, such as an ARM SC-100 processor 52 is also connected to the high speed bus 50.

The host controller 12 also comprises a RSA/AES/DES engine 60, which is a secure co-processor to the ARM SC-100 processor 52. The engine 60 is connected to the high speed bus 50 through an arbitration circuit 62. Since both the engine 60 and the processor 52 can request memory or other resources of the high speed bus 50 at the same time, the arbitration circuit 62 arbitrates simultaneous requests for access to the bus 50. The engine 60 also has access to a dedicated high speed cache RAM, such as an SRAM 64. Finally, a bridge circuit 68 is also connected to the high speed bus 50. The bridge circuit 68 is also connected to a slower bus 70, to which a timer 72 is connected, a clock generator 74 is connected, a power management circuit 76 is connected, a security monitoring circuit 78 is connected, a UART 80 is connected, and a SPI circuit 82 (Serial Peripheral Interface—a well known bus) is connected. The UART 80 and the SPI 82 are also connected to a bus 90, which is connected to the NFC 24. The controller 12 is also connected to a bus 91 which is a ISO7816 serial interface bus. It is a byte oriented Universal Asynchronous Receiver/Transmitter (UART) interface commonly found in prior art cell phones between the phone and the SIM card. This type of interface (using UART) is being replaced by the USB interface. Thus, the presence of the bus 91 is for backward compatibility only.

Operation of the Mobile Wireless Communication Device

There are many modes of operation of the mobile wireless communication device 100 of the present invention. Initially, it should be noted that the mobile network operator (MNO), the operator of the cellular network 110, distributes each of the removable cards 10, and also has a server 200 connected to the Internet 150. Each of the removable cards 10 of the present invention distributed by the MNO is assigned a unique public IP address by the MNO which is stored in the non-volatile memory portion of the removable card 10. The unique public IP address directs the device 100 to the MNO server 200. As disclosed in U.S. patent application Ser. No. 11/637,420, published on Jun. 28, 2007 under publication 2007-0147115, non-volatile memory is present in the NAND memory 20 as well as NOR memory being embedded in the controller 14. In either event, the MNO assigns and pre-stores a unique public IP address in the non-volatile memory portion of the removable card 10. The non-volatile memory may be divided into two portions, with the partition between the first portion and the second portion being alterable. The partitioning of the first portion/second portion can be done by the MNO provider of the removable card 10. The first portion can be accessed by the processor which controls the transceiver 104 and browser and media player 112, and the other hardware circuits that control the communication of the device 100. The second portion can be accessed by the processor 52, in the removable card 10, which is accessible by the user. In addition, the processor 52 controls the degree of access (which includes the type of information) that a user may have to the first portion. In any event, for reasons to be discussed, the unique public IP address assigned by the MNO is stored in the first portion, and the processor 52 prohibits access thereto. However, other types of information, such as sensitive user information, such as user name, credit card, etc. may also be stored in the first portion and the processor 52 may grant the user limited access to those type of information.

After the removable card 10 of the present invention is distributed to users, and the user has inserted the card 10 into the device 100 of the present invention, the user can then use the device 100 to operate on the cellular network 110, as it was done in the prior art. Similar to the prior art, the card 10 may also have information related to the usage of the device 100, such as telephone number, access code, number of minutes, calling plan etc on the cellular network 110 stored in the first portion (user restricted) of the memory portion of the card 10. Clearly the storage of this type of information in the user restricted is appropriate, so that the user cannot have unlimited access. In this manner, the removable card 10 functions no differently than the SIM card of the prior art when used with the cellular network 110.

The inventive features of the present invention can be seen when the user attempts to use the device 100 to access the Internet 150. There are at least two possible modes (first mode or second mode) to access the Internet 150. The programming code stored in the non-volatile memory 14 can cause the processor 52 to access the Internet 150 in either the first mode or the second mode of operation.

In the first mode, the Internet 150 can be accessed by the removable card 10 through the device 100 through the cellular network 110. In that event the device 100 is connected to the Internet 150 through the access servers connected to the cellular network 110, near the tower 120. When initiated, the access servers (similar to an Internet Service Provider (ISP)) may assign a dynamic public IP address to the device 100 during the session connecting the device 100 to the Internet 150. Such dynamic assignment of public IP addresses when the device 100 is connected to the Internet 150 is well known in the art and is in accordance with the DHCP protocol. Alternatively, as discussed previously, the public IP address may be pre-assigned and stored in the removable card 10. The browser and media player 112 of the device 100 is then used to browse or surf the Internet 150. Contents from the Internet 150 can then be downloaded and saved in the removable card 10, in either the user restricted memory portion or the user accessible portion of the card 10.

For secure communication with the Internet, the user restricted portion of the memory portion of the card 10 may store a secret key. The RSA/AES/DES engine 60 of the host controller 12 can use that secret key to encrypt and/or decrypt communication to and from the Internet 150. The secret key can be provided by the MNO when it initially distributes the removable card 10 or it can be downloaded from the MNO server 200 which is connected to the Internet 150, when the device is connected to the Internet 150.

There are two ways by which the RSA/AES/DES engine 60 of the host controller 12 can securely use the secret key stored in the user restricted memory portion of the card 10, to encrypt and/or decrypt communication to and from the Internet 150. First, assume that the host controller 12, and the memory controller 14 and NAND memory 20 and PSRAM 22 are all integrated in a single integrated circuit. Then the secret key can be stored in the NAND memory 20, retrieved by the memory controller 14 and provided to the RSA/AES/DES engine 60 of the host controller 12 to encrypt messages to the Internet 150. Conversely, messages or information from the Internet 150 received by the device 100 may be decrypted by the RSA/AES/DES engine 60 of the host controller 12 using the secret key, and then the decrypted information further processed, stored, displayed or acted upon.

Alternatively, because the host controller 12, the memory controller 14 and the NAND memory 20 may be large semiconductor dies, it may be impractical and/or uneconomical to integrated all of them into a single integrated circuit die. Thus, the host controller 12, the memory controller 14 and the NAND memory 20 might all be packaged into a SIP (System-In-Package) module, with the memory controller 14 and the NAND memory 20 integrated into a single semiconductor die, and with the host controller 12 in another single semiconductor die. In that event, if the secret key is stored in the NAND memory die 20, then that secret key may be vulnerable to discovery by an unscrupulous third party who opens the removable card 10 and probes the bus 16. To overcome this potential vulnerability, the host controller 12 after boot up will execute a program to generate a random key pair. This program may be a random number generator. Thus, the key pair that is generated is effective only for the duration of that session (i.e. valid only for as long as power is supplied). The key pair, which is a technology well known, consists of a public key and a private key. The public key portion is supplied to the memory controller 14 across the bus 16. The memory controller 14 encrypts the secret key from the NAND memory 20 using the public key, and returns that encrypted result to the host controller 12 across the bus 16. The host controller 12 then decrypts that result using the private key portion of the key pair and extracts the secret key that was originally stored in the NAND memory 20. The host controller 12 then uses the secret key to encrypt data to the Internet 150. The same secret key is of course also used to decrypt the data received from the Internet 150. The encryption of the secret key using the public key by the memory controller is done only once during boot up. After the secret key is encrypted and is supplied to the host controller 12, it is decrypted and the secret key is then stored in the SRAM 64. Thereafter, it is used during access to/from the Internet 150. Of course, once the session is over, and the power removed from the device 100 and the removable card 10, the secret key in the SRAM 64 is lost, and the procedure of generating a key pair upon boot up must be done again.

The information retrieved from the Internet 150, via the wireless network 110, may be saved in the user restricted portion of the removable card 10 which is associated with an assigned private IP address. The private IP address can be first assigned by the MNO and stored in the removable card 10 before distribution. Alternatively, the private address may be assigned by the access server connected to the cellular network 120. Finally, the private address may simply be the public IP address dynamically assigned by the access severs and then translated by the NAT circuit 106 into a private IP address. After the information from the Internet 150 is stored in the removable card 10, it can be retrieved by the browser and media player 112, and displayed on the display 108 of the device 100, using the private IP address. This is similar to the operation of an intranet. Thus, the removable card 10 serves to function as a local (private) server in providing the data stored in its memory to the browser and media player 112.

The use of a "private" IP address when the browser 112 is accessing in a local mode is advantageous because it is more economical than having two public IP address assigned to the device 100: one IP address for the phone portion of the device 100 when surfing or browsing the Internet 150 and another public IP address for the removable card 10, when viewing the contents thereof. Since the content stored in the removable card 10 is for the user using the device 100, there is no need for the removable card 10 to have a public IP address. Furthermore, the time when the user is viewing the contents stored in the removable card 10, the device 100 may not be connected to the Internet 150.

Figure 5:
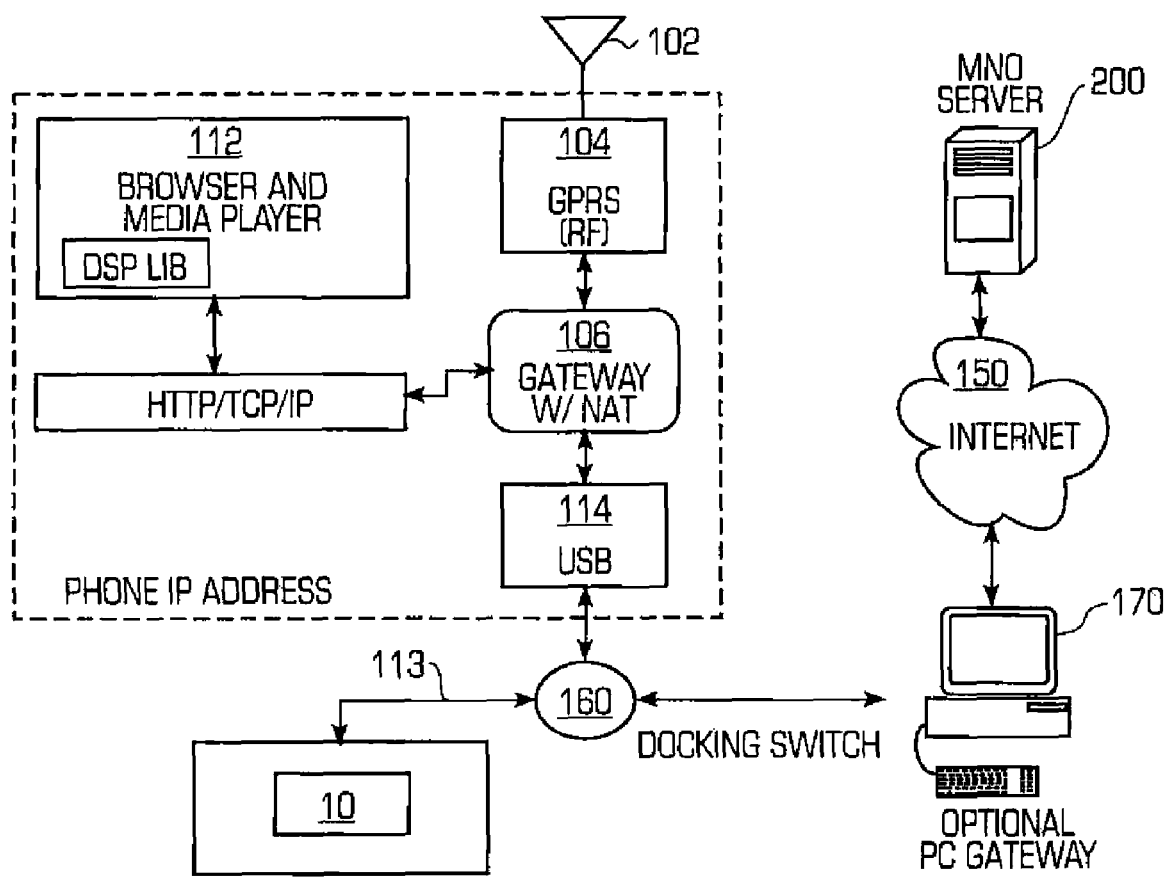
FIG. 5 is a diagram of the two modes of communication of the mobile wireless communication device with the removable card of the present invention with the Internet, wherein in the first mode, the removable card communicates through the wireless communication device wirelessly with the mobile network for access to the Internet, and wherein in a second mode the removable card is connected to a network portal device for connection to the Internet.

In a second mode, the device 100 can access the Internet 150 other than through the cellular network 110. One way is through a network portal device 170 such as a terminal connected to a PC (for example through a USB port). Another way is through a wireless link, such as Wi-Fi which connects wirelessly to a receiving device (not shown) that is connected to the Internet 150. In either way, the device 100 has a docking switch 160. Referring to FIG. 5, there is shown schematically a diagram of this mode of communication (along with the first mode) Normally, in the first mode, the removable card 10 is connected to the USB interface 114 through the docking switch 160. However, when the device 100 is connected to the PC 170 or through the NFC 24, the docking switch 160 is changed causing the removable card 10 to disconnect from the USB interface 114. Thus, for example, when a USB cable is connected to the docking switch 160, the removable card 10 disconnects from the USB interface 114 and connects directly to the PC 170 along its USB port. The docking switch 160 then breaks the connection between the removable card 10 and the rest of the device 100 including the transceiver 104. Because the removable card 10 contains the cellular network 110 access information, if the device 100 was accessing the Internet wirelessly through the cellular network 110, then the device 100 would cease to transmit/receive wirelessly to/from the cellular network 110. Similar to the first mode of operation, when the device 100 is connected to the Internet 150 through the docking switch 160, to the PC gateway 170, it is initially assigned a public IP address, by the Internet Service Provider (ISP) for connection to the Internet 150. Again, this is a dynamically assigned public IP address for use during the session that the device 100 is connected to the Internet 150.

Finally, because the removable card 10 stores a public IP address assigned by the MNO, in the user restricted portion of the memory, that public IP address directs the device 100 to the MNO server 200. During the time period when the device 100 is connected to the Internet 150 through the PC portal 170, and when the user is not browsing or surfing the Internet 150, (as in e.g. when the device 100 is in the docking station connected to the docking switch 160 for charging the battery for the device 100) the device 100 can go the MNO server 200 using the public IP address stored in the removable card 10. The MNO server 200 can then cause content, such as movies, or programming code (updates for the device 100) to be downloaded and stored in the user restricted portion of the removable card 10 of the device 100. The benefit of this mode is that a large amount of content can be downloaded when the device 100 is not connected to the cellular network 110, and when the user is not actively surfing or browsing the Internet 150. The downloaded movies or other material can be subsequently activated by an authorization code and/or payment code. Since the movies or other content were downloaded from the MNO server 200, the user can be sure of the trustworthiness of the content (i.e. free from virus etc.). In addition, since the owner of the content knows that the content is downloaded in a secure manner and stored in a user restricted portion, they can be assured that illicit copies will not be made. In this manner, this becomes a trustworthy procedure for all parties. Finally, by also permitting programming code to be distributed in this manner, an efficient and convenient mode is provided to assure the update of the devices 100.

Furthermore, each removable card 10 may also be assigned a unique IP address by the MNO operator. This offers another unique feature of the present invention. When the device 100 with the removable card 10 connected thereto is connected to the Internet 150, and with the removable card 10 having a unique IP address, the MNO server 200 which is also connected to the Internet 150 can download information for all removable cards 10 or just certain removable cards 10 or even only a specific removable card 10. The information downloaded to one or more removable cards 10 may be stored in the user restricted memory portion of the card 10. Examples of information that can be stored in the user restricted portion may include: administrative information such as change in calling plan, increase in minutes etc. Further, the "information" may be data or it may be programming code (including Java applets) for execution by the host controller 12. Thus, for example, the "information" downloaded from the MNO server 200 may be a program causing the host controller 12 to execute the code causing the device 100 to access the cellular network 110 to access the Internet 150 periodically or to access specified location on the Internet 150 (such as the IP address of the MNO server 200) or in some specified manner to retrieve updates, downloads, etc.

Although the foregoing has described the invention for use in a SIM module in a cell phone, it should be clear that the present invention may be used in any removable card that stores secured information.

What is claimed is:

1. A secure removable card having electrical connections for communication therewith, comprising:
    a first integrated circuit die, said first die including a processor;
    a second integrated circuit die, said second die including a non-volatile memory for storing a secret key, and a controller for controlling the operation of the non-volatile memory;
    a bus connecting the first die with the second die;
    wherein the processor for generating a key pair, having a public key portion and a private key portion upon power up, with said key pair generated not based upon stored data, and for transferring the public key portion across the bus to the second die;
    wherein the controller for receiving the public key and for encrypting the secret key with the public key to generate a first encrypted key, and for transferring the first encrypted key across the bus to the first die; and
    wherein the processor for receiving the first encrypted key and for decrypting the first encrypted key to recover the secret key; and for encrypting data with said secret key for communicating along the electrical connections external to the card.

2. The card of claim 1 wherein said first die further includes a volatile memory embedded with said processor;
    wherein said volatile memory for storing the secret key.

3. The card of claim 2 wherein said first die further comprising a random number generator, wherein the random number generator generate the public key portion and the private key portion.

4. The card of claim 1 wherein said processor decrypts the first encrypted key using the private key portion.

5. A method of securely communicating with a removable card, said card having electrical connections thereto, and having a first semiconductor die, a second semiconductor die with an electrical bus connecting the first die with the second die, packaged together, said first die having a processor, said second die having a non-volatile memory for storing a secret key, and a controller for controlling the operation of the non-volatile memory, said method comprising:
    generating a key pair, upon power up of the processor, having a public key and a private key by the processor, wherein said key pair generated is not based upon stored data;
    transferring the public key to the second die via the electrical bus;
    encrypting the secret key using the public key by the controller to produce an encrypted key;
    transferring the encrypted key to the first die via the electrical bus;
    decrypting the encrypted key to extract the secret key by the processor; and
    using the secret key to encrypt data to communicate on the electrical connections external to the card.

6. The method of claim 5 wherein said key pair is generated by a random number generator.

7. The method of claim 6 wherein said secret key is stored in a volatile memory embedded in the processor.

8. The method of claim 5 wherein said key pair is generated upon power up.

9. The method of claim 5 wherein said encrypted key is decrypted by using the secret key.

* * * * *